July 8, 1947. H. G. ALLEN 2,423,431
FISH LURE
Filed March 7, 1944
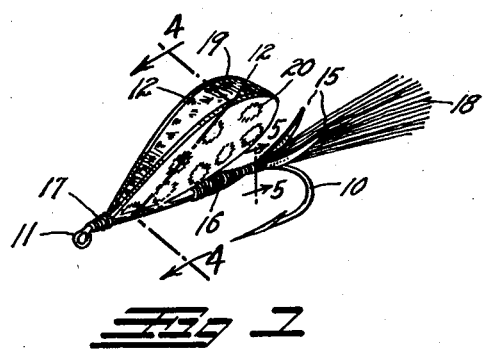
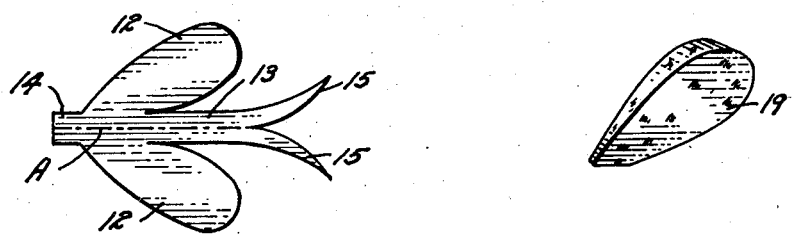
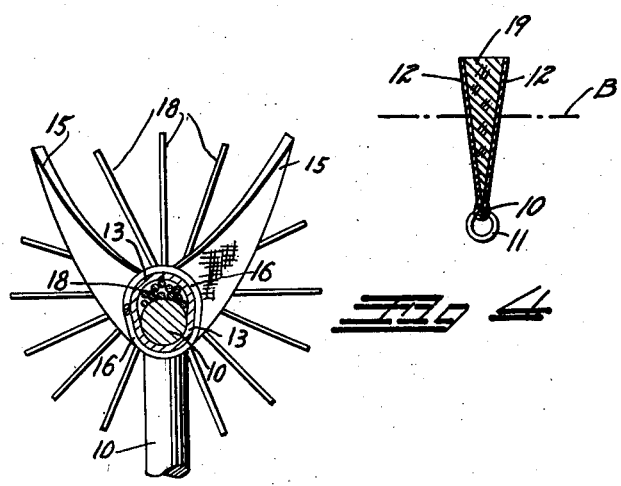
INVENTOR.
HAROLD G. ALLEN
BY
ATTORNEY Patented July 8, 1947

2,423,431

UNITED STATES PATENT OFFICE 2,423,431

FISH LURE

Harold G. Allen, Denver, Colo.

Application March 7, 1944, Serial No. 525,399

3 Claims. (Cl. 43—48)

This invention relates to a fish lure and has for its principal object the provision of a lure which will simulate a floating insect and which will float with the hook portion thereof submerged.

Another object of the invention is to provide a lure which can be easily and quickly manufactured; which will be adaptable to quantity production; and which will be exceedingly substantial so as to withstand hard usage.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing—

Fig. 1 is a perspective view of a fish lure in which the principles of this invention are embodied;

Fig. 2 is a plan view of a blank of sheet material as employed in the manufacture of the improved lure;

Fig. 3 illustrates a block of buoyant material, such as cork, such as incorporated in the lure;

Fig. 4 is a vertical cross section through the winged portion of the lure, taken on line 4—4, Fig. 1; and Fig. 5 is a greatly magnified detail section through the tail portion of the lure taken on the line 5—5, Fig. 1.

The improved lure is built about the shank of a fish hook 10 having any desired eye 11, by means of which it may be secured to the fish line. A blank of sheet material having an outline substantially as illustrated in Fig. 2 is folded about the shank of the hook 10.

The blank is formed with two wing portions 12 and elongated body portion 13, terminating at the front in a head portion 14 and at the rear in flaring tail portions 15. The blank is folded upwardly about the hook shank along its longitudinal center line as indicated by the fold line "A," Fig. 2. The body portion 13 is permanently secured to the hook shank by means of a suitable thread wrapping 16, and the head portion 14 is similarly secured thereto by means of a second thread wrapping 17. Both wrappings are impregnated with water proofing material. The rearward wrapping 16 also secures a tail hackle 18 in place on the shank of the hook between the two upwardly turned sides of the folded body portion 13.

A block 19 of bouyant material, such as cork, is shaped to conform to the outline of the folded wing portions 12 and is wedge-shaped so that it may be placed between the two wings and cemented thereto to maintain the wings in flaring relation. Since the bouyant portion of the lure is positioned above the hook, and above the non-buoyant portion thereof, the lure will float vertically partially submerged to a depth substantially as indicated by a surface line "B," Fig. 4.

The blank is preferably, but not necessarily, formed of water-proofed fabric and may carry any desired surface ornamentation, such as indicated in 20 in Fig. 1. It will be noted that the tail portions 15 flare upwardly and outwardly about the hackle 18 to create a live realistic appearance.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A fish lure comprising: a hook having a shank forming a body for the lure; a one-piece wing structure having a fold extending medially and longitudinally to provide divergent wings, said shank lying in the fold thereof; a head portion on said wing structure protruding forwardly at the fold; a tail portion on said wing structure protruding rearwardly at the fold; wrappings about said shank and the head and tail portions of said wing structure; and a wedge-shaped block positioned between said divergent wings, the narrow edge of said block lying along said shank, said wings being secured to the opposite sides of said block.

2. A fish lure comprising: a hook having a shank forming a body for the lure; a one-piece wing structure having a fold extending medially and longitudinally to provide divergent wings, said shank lying in the fold thereof; a head portion on said wing structure protruding forwardly at the fold; a tail portion on said wing structure protruding rearwardly at the fold; wrappings about said shank and the head and tail portions of said wing structure; a wedge-shaped block positioned between said divergent wings, the narrow edge of said block lying along said shank, said wings being secured to the opposite sides of said block; and a tail hackle lying on said shank and projecting rearwardly thereof, said hackle being secured in place by said wrapping at said tail portion.

3. A fish lure comprising: a hook having a shank forming a body for the lure; a one-piece wing structure having a fold extending medially and longitudinally to provide divergent wings, said shank lying in the fold thereof; a head portion on said wing structure protruding forwardly at the fold; a tail portion on said wing structure protruding rearwardly at the fold; wrappings about said shank and the head and tail portions of said wing structure; a wedge-shaped block positioned between said divergent wings, the narrow edge of said block lying along said shank, said wings being secured to the opposite sides of said block; and rearwardly, outwardly and upwardly flaring tail portions extending from said wrapping at said tail portion on opposite sides of said shank.

HAROLD G. ALLEN.

REFERENCES CITED

The following references are of record in the file of this patent:

UNITED STATES PATENTS

| Number | Name | Date |
|---|---|---|
| 2,114,342 | Gardner | Apr. 19, 1938 |
| 1,257,008 | McCarthy | Feb. 19, 1918 |
| 1,589,065 | Gere et al. | June 15, 1926 |
| 2,043,244 | Hauffman et al. | June 9, 1936 |
| 1,573,288 | Wilson | Feb. 16, 1926 |
| 1,855,096 | Chamberlaine | Apr. 19, 1932 |
| 549,842 | Cable | Nov. 12, 1895 |
| 934,087 | Moran | Sept. 14, 1909 |
| 1,834,277 | Haberl | Dec. 1, 1931 |